United States Patent [19]

Farley et al.

[11] Patent Number: 5,511,916
[45] Date of Patent: Apr. 30, 1996

[54] SHIPPING CONTAINER FOR DUNNAGE

[75] Inventors: Charles Farley, Ortonville; Lawrence E. Plawecki, Davisburg, both of Mich.

[73] Assignee: Aldon Pattern, Inc., Auburn Hills, Mich.

[21] Appl. No.: 804,840

[22] Filed: Dec. 6, 1991

[51] Int. Cl.$^6$ .................................................. B60P 7/06
[52] U.S. Cl. .................. 410/2; 410/43; 410/46; 264/102; 264/219; 264/275
[58] Field of Search ................ 410/42, 43, 48, 410/49, 52, 87, 2; 264/102, 219, 275

[56] References Cited

U.S. PATENT DOCUMENTS

| | | | |
|---|---|---|---|
| 3,298,894 | 1/1967 | Barnette | 264/275 |
| 3,881,767 | 5/1975 | Klees | 410/87 |
| 4,305,508 | 12/1981 | Rodgers | 410/49 |
| 4,381,908 | 5/1983 | Roth | 264/275 |
| 4,382,733 | 5/1983 | Rodgers | 410/49 |
| 4,391,377 | 7/1983 | Ziaylek, Jr. | 410/49 |
| 4,403,697 | 9/1983 | Forshee | 410/49 |
| 4,439,386 | 3/1984 | Antczak | 264/102 |
| 4,531,639 | 7/1985 | Zopf . | |
| 4,806,297 | 2/1989 | Brown et al. | 264/102 |
| 4,824,059 | 4/1989 | Butler . | |
| 4,839,379 | 6/1989 | Stanek et al. . | |
| 4,851,286 | 7/1989 | Maurice . | |
| 4,889,750 | 12/1989 | Wiley . | |
| 5,227,408 | 7/1993 | Hanna et al. . | |

Primary Examiner—David A. Bucci
Assistant Examiner—Gregory A. Morse
Attorney, Agent, or Firm—Gifford, Krass, Groh, Sprinkle, Patmore, Anderson & Citkowski

[57] ABSTRACT

A shipping container for dunnage, such as automotive engines, is disclosed having a rigid frame and a pair of spaced apart dunnage support members which are secured to the frame. The dunnage support members each have upwardly extending portions which are adapted to abut against and support selected areas of the dunnage. These upwardly extending portions are constructed of a material formed by the isothermal reaction of isocyanate and a resin which are selected such that the elastomeric material resulting from the isothermal reaction is essentially devoid of entrapped air bubbles. A method for forming the dunnage support members is also disclosed.

5 Claims, 2 Drawing Sheets

SHIPPING CONTAINER FOR DUNNAGE

BACKGROUND OF THE INVENTION

I. Field of the Invention

The present invention relates to a shipping container for dunnage and a method for constructing the same.

II. Description of the Prior Art

There have been a number of previously known shipping containers for dunnage and especially dunnage consisting of heavy industrial components, such as automotive engines. These previously known shipping containers typically comprise a frame constructed of a rigid material, such as tubular steel. Furthermore, each container is usually designed to transport a number of the industrial components.

In order to support each component, a pair of spaced apart dunnage support members are secured to the frame and are spaced apart from each other. These dunnage support members each have upwardly extending portions which are adapted to abut against and support selected areas of the dunnage. Consequently, with the dunnage positioned on the dunnage support members, the dunnage is wedged in between the dunnage support members and thus supported against movement.

These previously known dunnage support members conventionally comprise a reinforcing bar encased in an elastomeric material such that the elastomeric material contacts and supports the dunnage. The actual shape of the upwardly extending portions of the dunnage support members varies, of course, depending upon the particular dunnage transported. Furthermore, the shape of the upwardly extending portions of the dunnage support members are custom fabricated for each different type of dunnage.

Previously, the dunnage support members have been constructed by placing the reinforcing bars within a mold chamber having the shape of the desired dunnage support member. Thereafter, isocyanate and resin are injected into the mold chamber where the isocyanate and resin undergo an isothermal reaction. The elastomeric material resulting from this thermal reaction fills the mold chamber and, in doing so, encases the reinforcing bars.

The elastomeric material formed by this previously known reaction of isocyanate and resin is filled with tiny air bubbles so that the resulting isomeric material is spongy. Consequently, once the dunnage is wedged between the spaced apart dunnage support members, the spongy elastomeric material compresses slightly and cushions the dunnage.

These previously known dunnage support members, however, have suffered from a number of disadvantages. One such disadvantage is that the shipping container is often subjected to high impact during transport. This is especially true when the shipping container is transported by train. In such situations, the spongy dunnage support members have been known to crumble or otherwise abrade during transport. Such abrasion or crumbling of the elastomeric material is unacceptable since it can result in damage to the dunnage.

SUMMARY OF THE INVENTION

The present invention provides a shipping container for dunnage which overcomes the above mentioned disadvantages of the previously known devices.

In brief, the container of the present invention comprises a rigid frame having at least one and preferably a pair of spaced apart dunnage support members secured to the frame. Each dunnage support member includes an upwardly extending portion which is adapted to abut against and support selected areas of the dunnage.

Each dunnage support member includes a reinforcing member which is encased within an elastomeric material. Unlike the previously known devices, the elastomeric material is formed by the reaction of an isocyanate and resin selected such that the elastomeric material essentially devoid of entrapped gas or air bubbles. Preferably, the elastomeric material which encases the reinforcing bars of the present invention has a hardness of between Shore A 85 and Shore A 95.

The present invention also discloses a method for constructing the dunnage members. In this method, isocyanate and resin are communicated from separate sources to a mold chamber corresponding in shape to the shape of the desired dunnage support member. The mold chamber is closed and, once the isocyanate and resin are communicated to the mold chamber, they react in an isothermal reaction thus forming the elastomeric material.

In order to prevent the formation of air bubbles within the elastomeric material, a vacuum pump is coupled to the source of the isocyanate which evacuates the air from the isocyanate container. In doing so, the resulting elastomeric material formed for the dunnage support member is essentially devoid of gas or air bubbles.

BRIEF DESCRIPTION OF THE DRAWINGS

A better understanding of the present invention will be had upon reference to the following detailed description, when read in conjunction with the accompanying drawing, wherein like reference characters refer to like parts throughout the several views, and in which.

DETAILED DESCRIPTION OF PREFERRED EMBODIMENTS OF THE PRESENT INVENTION

Figure 1:
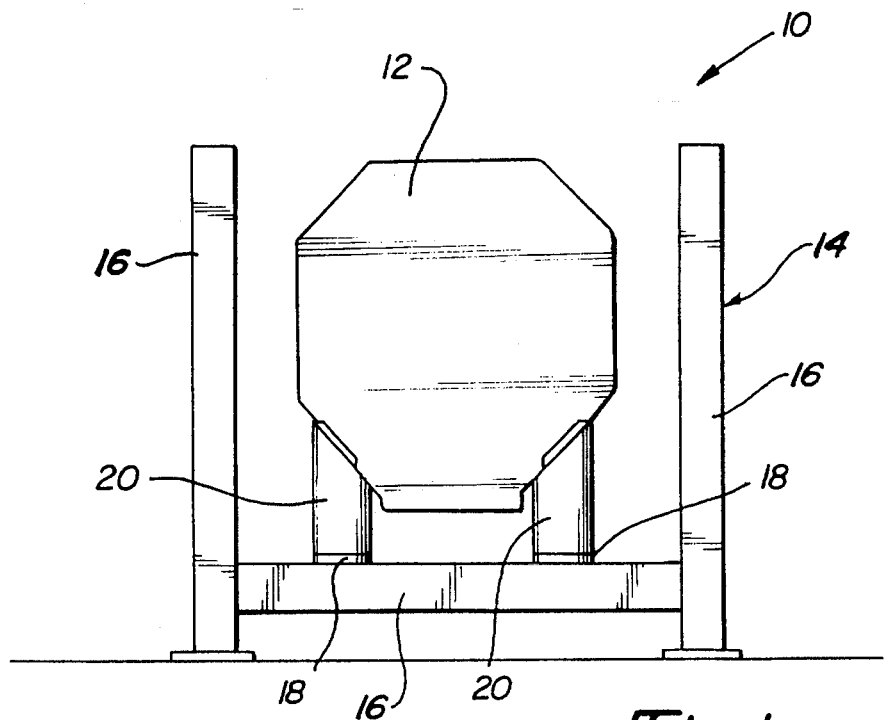
FIG. 1 is an end view illustrating a preferred embodiment of the present invention.
Figure 2:
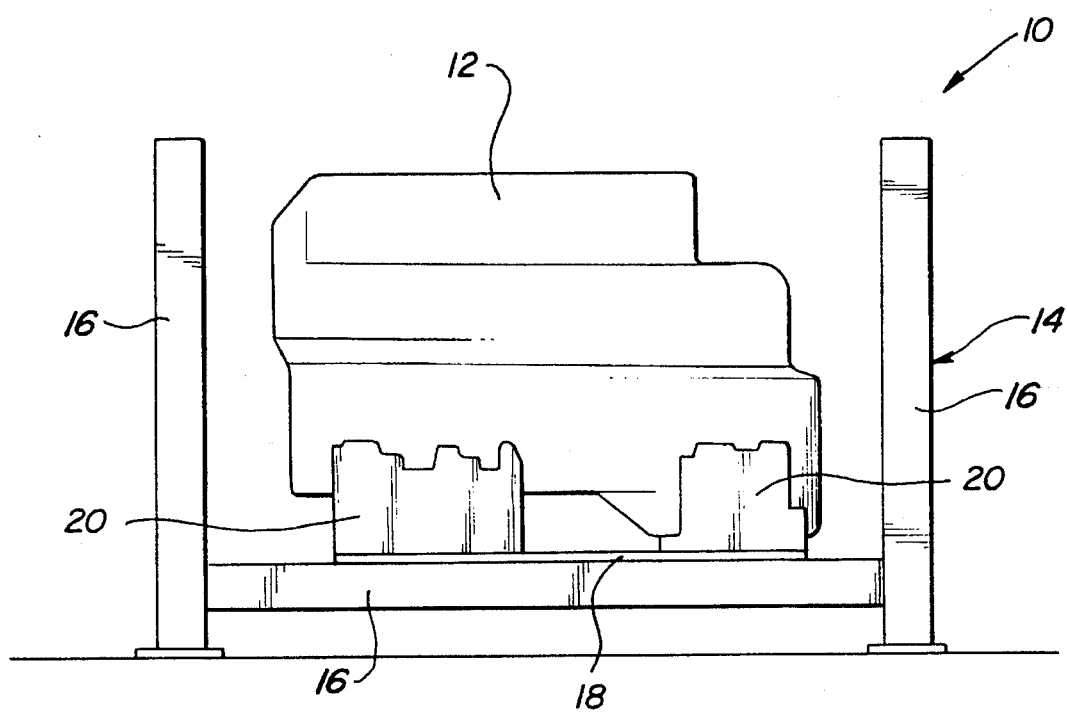
FIG. 2 is a side view illustrating the preferred embodiment of the present invention.

With reference first to FIGS. 1 and 2, a preferred embodiment of the dunnage support container 10 of the present invention is thereshown for transporting dunnage 12, such as an automotive engine. Even though a single engine 12 is shown in FIGS. 1 and 2, typically a plurality of engines 12, or other dunnage, are transported by a single container 10. However, the dunnage support members, which will be subsequently described in greater detail, are substantially identical for each engine 12 so that the support for only a single engine 12 will be described in detail, it being understood that the dunnage support members for each engine will be substantially identical.

Still referring to FIGS. 1 and 2, the container 10 comprises a frame 14 constructed of a rigid material, such as tubular steel. The frame 14 includes a plurality of frame members 16 which are secured together in any conventional fashion, such as by welding.

In order to support the dunnage 12, a pair of spaced apart dunnage support members 18 are secured to the frame 14 so that the dunnage support members 18 are spaced apart and generally parallel to each other. Each dunnage support member 18 includes a plurality of upwardly extending portions 20 which are adapted to abut against and support selected areas of the dunnage 12. Furthermore, the actual configuration or shape of the upwardly extending portions 20 of the dunnage support members 18 are custom designed for the particular dunnage 12 which is transported by the container 10.

Figure 3:
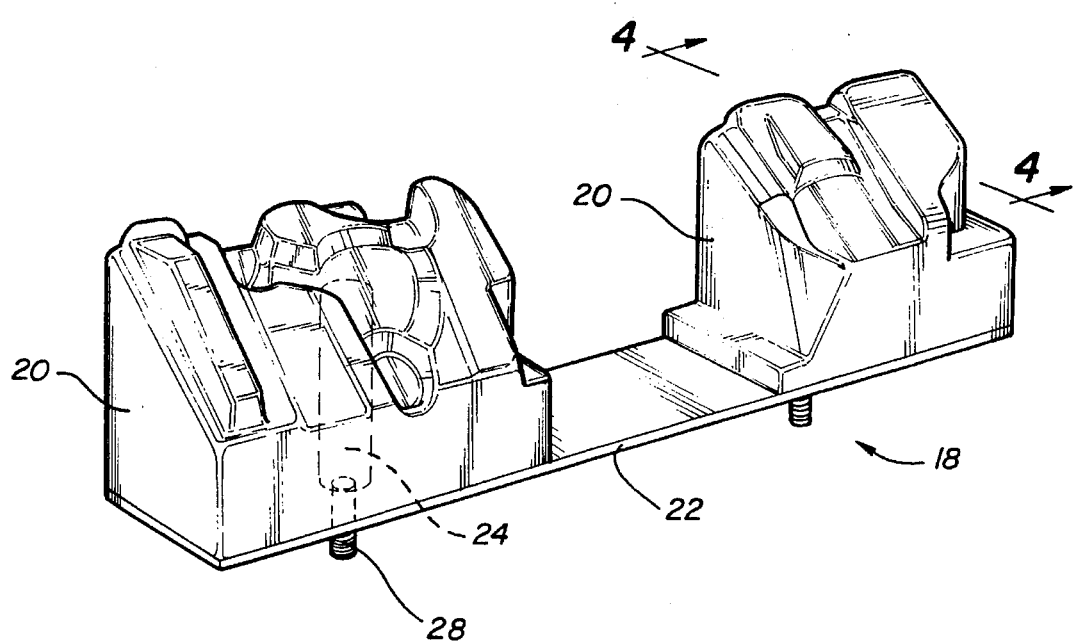
FIG. 3 is an elevational view illustrating one dunnage support member.
Figure 4:
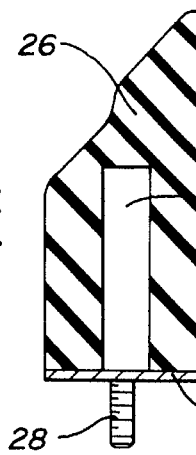
FIG. 4 is a sectional view taken substantially along line 4—4 in FIG. 3.

With reference now to FIGS. 3 and 4, one dunnage support member 18 is thereshown in greater detail and comprises an elongated base plate 22. One or more elongated reinforcing bars 24 are fastened to and extend upwardly from the plate 22. Threaded fastening members 26 also are secured to and extend downwardly from the plate 22 for securing the support member 18 to the container frame 16.

Still referring to FIGS. 3 and 4, the reinforcing bars 24 are encased within an elastomeric material 26 so that the elastomeric material 26 engages and supports the dunnage 12. In the preferred embodiment of the invention, the elastomeric material 26 is formed from isocyanate and a resin selected such that the resulting elastomeric material 26 is essentially devoid of all air or gas bubbles. Thus, unlike the previously known dunnage support members, the elastomeric material 26 is hard and has a hardness of between Shore A 85 and Shore A 95.

One material which is found to be suitable for forming the elastomeric 26 is manufactured by BASF, Material No. WUC39311R for the isocyanate. Any conventional resin can be used to react with the isocyanate.

In practice, it has been found that by constructing the dunnage support members in the above described fashion, the dunnage support members rigidly support the dunnage 12 against movement during transport, even when the transport is subjected to high shocks and impacts of the type common on railroads. Furthermore, despite such shocks and impacts during transport, the elastomeric material 26, due to its high impact and abrasion resistant characteristics, resists breaking and crumbling that was common with the previously known dunnage support members.

Figure 5:
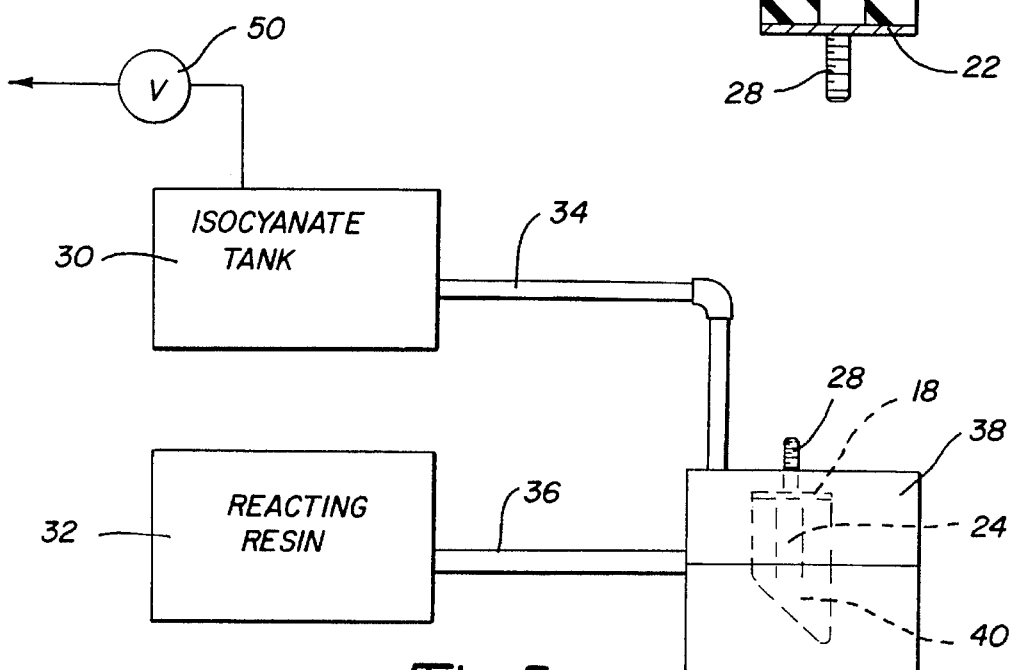
FIG. 5 is a diagrammatic view illustrating a preferred method of the present invention.

With reference now to FIG. 5, a method for constructing the dunnage support members 18 is there illustrated diagrammatically as comprising a first source or tank 30 of isocyanate and a second tank or source 32 of reacting resin. Isocyanate from the tank 30 and resin from the tank 32 are conveyed through appropriate conduits 34 and 36, respectively, to a mold 38 having a mold chamber 40. The mold chamber 40 is closed and has a shape which corresponds to the dunnage support member 18.

In practice, the base plate 22 with its attached reinforcing bars 24, are attached to the mold 40 by the bolts 28 so that the base plate 22 and reinforcing bars 24 are contained within the mold chamber 40. Thus, once the isocyanate and resin are communicated from their respective sources or tanks 30 and 32 to the mold chamber, the isocyanate and resin react by isothermal reaction and encase the reinforcing bars 24 in the desired fashion. Once the elastomeric material has "set", which usually takes a few minutes, the mold 38 is opened and the formed dunnage support member removed.

In order to prevent the formation of air bubbles within the elastomeric material, a vacuum pump 50 evacuates air from the isocyanate source or container 30. Such evacuation of the air thus precludes the formation of air bubbles within the resulting elastomeric material.

Having described our invention, many modifications thereto will become apparent to those skilled in the art to which it pertains without deviation from the spirit of the invention as defined by the scope of the appended claims.

We claim:

1. A shipping container for dunnage comprising:

a rigid frame, at least one dunnage support member, said dunnage support member having upwardly extending portions adapted to abut against and support selected areas of the dunnage, means for securing said dunnage support member to said frame, wherein said upwardly extending portions are constructed of an elastomeric material formed by the reaction of isocyanate and resin, said resin and isocyanate being selected such that said elastomeric material is essentially devoid of entrapped gas bubbles.

2. The invention as defined in claim 1 and comprising at least two dunnage support members, said dunnage support members being spaced apart from each other and adapted to engage opposite sides of the dunnage to thereby support the dunnage between the dunnage support members.

3. The invention as defined in claim 1 wherein the dunnage support member includes an interior reinforcing bar, said bar constructed of a rigid material.

4. The invention as defined in claim 1 wherein said elastomeric material has a hardness of between Shore A 85 and Shore A 95.

5. A method for constructing a dunnage support member having a shape adapted to abut against and support selected areas of dunnage comprising the steps of:

evacuating air from a source of isocyanate, intermixing said isocyanate from said source with a resin from a second source i n a closed mold chamber conforming in shape to the dunnage support member, said isocyanate and resin undergoing an isothermal reaction in the mold chamber which results in a hard elastomeric material essentially devoid of gas bubbles, removing the dunnage support member from the mold chamber following solidification of the isocyanate and resin,

\* \* \* \* \*